(12) United States Patent
Lahiri et al.

(10) Patent No.: US 7,467,279 B2
(45) Date of Patent: Dec. 16, 2008

(54) METHOD AND SYSTEM FOR FASTER INSTANCE STARTUP FOR LARGE RESOURCE CONFIGURATIONS

(75) Inventors: Tirthankar Lahiri, Palo Alto, CA (US); Bharat C V Baddepudi, Sunnyvale, CA (US); Poojan Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 11/395,613

(22) Filed: Mar. 30, 2006

(65) Prior Publication Data
US 2007/0233640 A1      Oct. 4, 2007

(51) Int. Cl.
G06F 12/06      (2006.01)
(52) U.S. Cl. .................................... 711/170; 710/56
(58) Field of Classification Search .............. 711/170, 711/148, 149; 713/1, 2, 100; 707/2; 710/56
See application file for complete search history.

(56) References Cited

U.S. PATENT DOCUMENTS

| 5,784,698 | A | * | 7/1998 | Brady et al. | 711/171 |
| 5,838,994 | A | * | 11/1998 | Valizadeh | 710/56 |
| 7,213,087 | B1 | * | 5/2007 | Bertone et al. | 710/56 |
| 7,231,412 | B2 | * | 6/2007 | Hitz et al. | 707/205 |
| 2006/0045111 | A1 | * | 3/2006 | Sinha et al. | 370/412 |
| 2007/0112995 | A1 | * | 5/2007 | Manula et al. | 710/310 |

* cited by examiner

*Primary Examiner*—Pierre-Michel Bataille

(57) ABSTRACT

A method for starting up a database system, comprising allocating memory spaces for three buffers; initializing two of the buffers; partially initializing the third buffer where the third buffer is larger than the other two; instructing the memory manager to initialize the remainder of the third buffer in the background process; performing recovery operations; and opening the database system for use. The database is operated in an open phase while the remainder of the third buffer is initialized in the background and ran in parallel to the recovery operation that may extend beyond the completion of opening the database. Thus opening the database prior to completion of full initialization and initializing the third buffer in the background improves the startup time of the database which becomes significant when the size of the third buffer is very large (e.g., 500 GB+).

21 Claims, 4 Drawing Sheets

METHOD AND SYSTEM FOR FASTER INSTANCE STARTUP FOR LARGE RESOURCE CONFIGURATIONS

BACKGROUND

1. Technical Field

The present invention relates to the field of computer systems. More particularly, embodiments of the present invention relate to a method and system for faster instance startup for computer systems having large resource configurations.

2. Background Art

With growing use of the Internet and use of information over the World Wide Web (WWW), the need for large memory components and large databases for storing large amount of information has increased and has become more prevalent. Starting up a database usually involves creating and initializing the database. A database system usually contains the configuration information, scripts and real-time data for transfer between the server and the client. This is true in general for any system that involves allocating and initializing a large number of subcomponents. Subcomponents may include resources such as memory and disk space which use a sequence of scripts to get initialized in order to become available to the user.

The time necessary to complete system allocation and initialization usually depends on several factors such as the actual size of the configuration information and scripts, the available resources in the system such as a processor or a virtual memory, and the network infrastructure. One approach to initializing a memory component (e.g., a buffer cache) in a database is to initialize the entire memory component before opening the database for use. However, as memory components increase in size, the amount of time required to initialize the entire memory component increases as well. For example, in some applications ultra-large buffer cache are used (e.g., 500 GB+) and as a result of using an ultra-large buffer cache, the amount of time required to initialize the entire buffer cache increases. As such, the time required to initialize the entire buffer cache (e.g., 500 GB+) at startup of the database can be of the order of minutes even in the absence of a need for recovery. The larger the initialization size of the buffer pool, the worse of an impact it has on the system.

Unfortunately there is no work around for a faster startup time for large memory components that requires complete initialization of the entire memory component prior to opening the database for use. As such, with the current system and in particular the initializing stage for starting up the system for a large memory component may take minutes to complete during which the system is unavailable for use. Hence, a need has risen to improve the startup time of a database with large memory components by improving the speed for their initialization process.

SUMMARY

Accordingly, there is a need to improve the startup time of a database system having large memory components by improving their initialization process during the startup process. This provides higher availability for the system and can add to the uptime for the system.

In one embodiment of the present invention, memory is allocated for each buffer pool, where all buffers except the top few larger buffer pool are fully initialized. The rest of the larger buffer pools are partially initialized in a deferred mode and the database system is allowed to operate while a memory manager initializes the remainder of the buffer pools in the background. Recovery operations start and run in parallel to the memory manager, which initializes the remainder of the buffer pools in the background while the database opens for use. It is appreciated, however, that any and all buffer pool can be partially initialized.

As a result of partially initializing the larger buffer pools and initializing the remainder in the background while running the recovery operation in parallel to background initialization process, the database systems open rapidly and become available for use prior to completion of full initialization of all the buffer pools. Consequently, initialization of the database and as a result its startup time improves and provides a better system availability to the user.

More specifically, an embodiment of the present invention pertains to a method of starting up a database system, the method comprising: allocating memory spaces for all buffers pools for use by the database system; fully initializing smaller buffer pools; partially initializing the larger buffer pools; instructing a memory manager to initialize a remainder of the larger buffer pools in a background process; performing recovery operations in parallel; and opening the database system for use.

Embodiments include the above and wherein the method further comprising: operating the database system in an open phase; and initializing the remainder of the larger buffer pools in the background process, wherein the background process and the recovery operations of the database system occur in parallel. Embodiments include the above and wherein the initializing comprises: performing metadata formatting; and defining reserved user data memory space. Embodiments further include the above where there are three major buffer pools wherein the first buffer is a shared pool, the second buffer is a large pool and the third buffer pool is a buffer cache.

Embodiments further include a computer-useable medium having computer-readable program code stored thereon for causing a computer system to execute a method for starting up a database system, the method comprising: allocating memory spaces for first, second and third buffer pools for use by the database system; initializing the first and second buffers pools; partially initializing the third buffer pool, wherein the third buffer pool is larger than the first and second buffer pools; instructing a memory manager to initialize a remainder of the third buffer pool in a background process; performing recovery operations; and opening the database system for use.

Embodiments include the above and wherein the computer-useable medium further comprising: operating the database system in an open phase; and initializing the remainder of the third buffer pool in the background process, wherein the background process and the recovery operations of the database system occur in parallel. Embodiments include the above and wherein initializing the computer-useable medium comprises: performing metadata formatting; and defining reserved user data memory space. Embodiments further include the above and wherein the first buffer is a shared pool, the second buffer is a large pool and the third buffer is a buffer cache.

Embodiments further include a system for starting up a database system, said system comprising: a memory allocator for allocating memory spaces for first, second and third buffers used by the database system; a startup program for fully initializing said first and second buffer pools and for partially initializing said third buffer pool, wherein said third buffer is larger than said first and second buffers; a memory manager in communication with said startup program, wherein upon completion of partial initialization said memory manager initializes a remainder of said third buffer in a background process wherein a portion of said background process operates during a period wherein said database system is open for use; and a recovery unit.

Embodiments include the above and wherein the recovery unit operates in parallel to the background memory manager process. Embodiments further include the above and wherein the first buffer is a shared pool, the second buffer is a large pool and the third buffer is a buffer cache. Embodiments further include the above and wherein the database system has more than three buffer pools. Embodiments further include the above and wherein the database system is open for use in an open mode with said memory manager concurrently initializing a remainder of said third buffer in said background process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
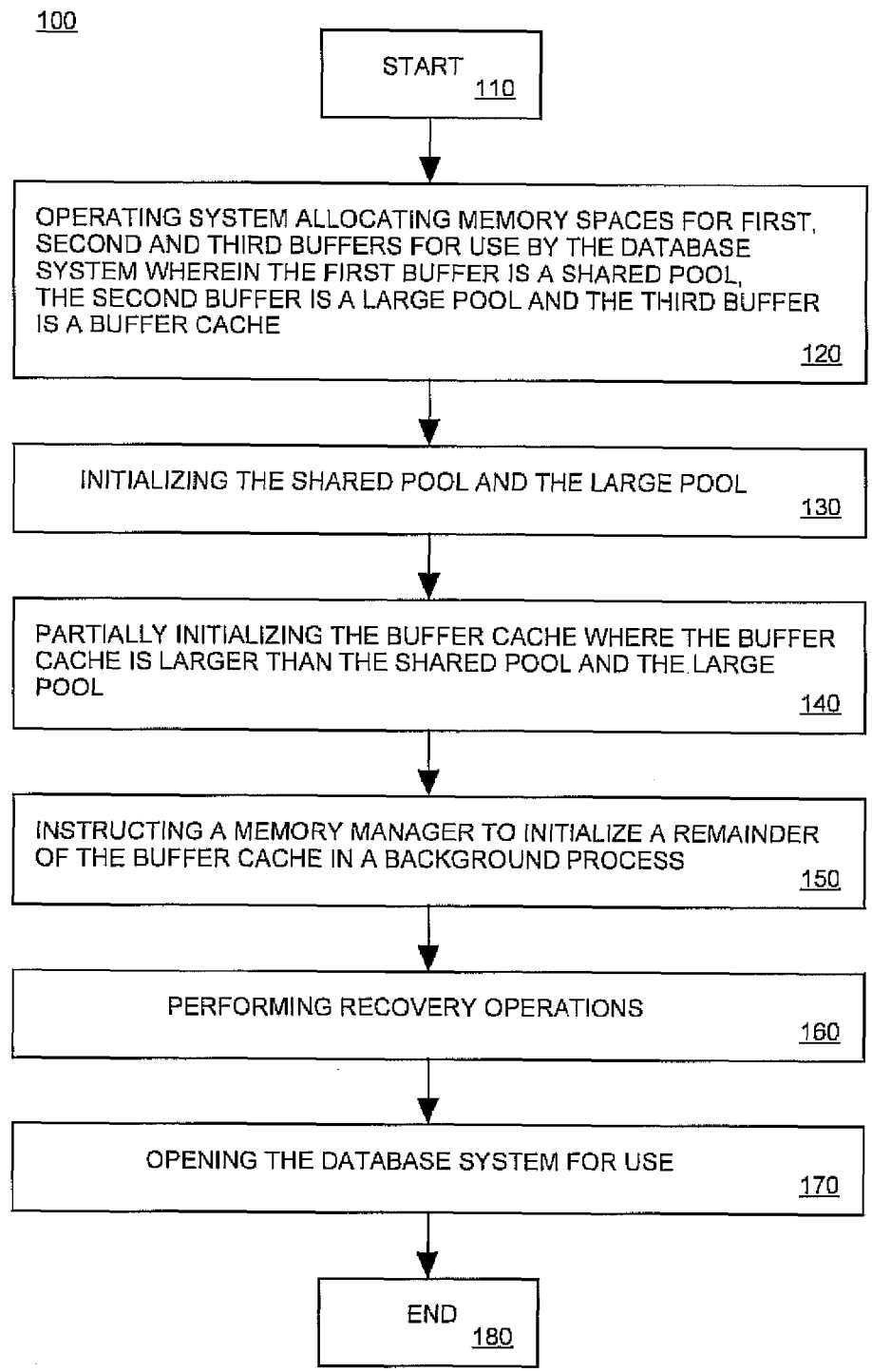
FIG. 1 shows a flow diagram of a computer implemented process for improving the startup time of a database system.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "transferring" or "executing" or "determining" or "instructing" or "messaging" or "issuing" or "halting" or "clearing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Faster Instance Startup for Large Resource Configurations Referring now to FIG. 1, a flow diagram 100 of a computer implemented process for improving the startup time of a database system according to one embodiment of the present invention is shown. FIG. 1 describes the functionality of components in a system diagram 300 in FIG. 3 for improving the startup time of a database system. Accordingly, FIGS. 1 and 3 should be considered in combination in order to provide a description of components in a system diagram and their respective functionality for improving the startup time of a database system. The process for improving the startup time of the database system starts at process 110. The operating system at 120 allocates memory spaces for first, second and third buffers for use by the database system wherein the first buffer may be a shared pool, the second buffer may be a large pool and the third buffer is a buffer cache. The term buffer and buffer pool is used interchangeably throughout this document. These buffers may reside within a system global area (SGA) memory.

It is appreciated that allocating memory spaces may be accomplished using well known methods and components. It is also appreciated that a method described is not limited to three buffers. All pools within the system global area could be potentially initialized in this deferred mode to improve the startup time of the database system. For example, the system may be extended to where four, five, or even more buffers are used. Furthermore, the system may be extended to other memory components such as a volatile (e.g., RAM), non-volatile (e.g., ROM) and on-disk memory components. It is further appreciated that buffers used are not necessarily shared pool, large pool and a buffer cache. In fact, other buffers such as java pool and streams pool may be included and used. In this example the shared pool, the large pool and the buffer cache are used for illustrative purposes only.

Referring still to FIG. 1, the shared pool and the large pool are then fully initialized at 130. It is appreciated that full initialization may be extended according to the number of buffers present in the system. For example, if five buffers (e.g., shared pool, large pool, buffer cache, java pool, and streams pool) are used, then four out of five buffers (e.g., shared pool, large pool, java pool and streams pool) may be fully initialized. It is further appreciated that at least one buffer is not fully initialized, for example if five buffers (e.g., shared pool, large pool, buffer cache, java pool, and streams pool) are used, then three out of five buffers (e.g., share pool, large pool and java pool) may be selected to be fully initialized.

In the preferred embodiment of the invention, smaller buffers are fully initialized at step 130 because they can be initialized rapidly due to their size. On the other hand, the larger buffers are not fully initialized yet because in order to fully initialize the larger buffers (e.g., buffer cache), more system resources are needed whereas smaller buffers can be fully initialized in a short period of time and the system resources used to fully initialize the smaller buffers can be released back to the system in a timely fashion. As such, number of buffers to be fully initialized may vary depending on the number of buffers present in the system and their relative size to one another.

Referring still to FIG. 1, upon fully initializing the shared pool and the large pool at step 130, the buffer cache gets partially initialized at 140 (e.g., 2 granules of memory per processor may be followed) where the buffer cache is larger than the shared pool and the large pool. It is appreciated that partial initialization may be extended to more than one buffer depending on number of buffers present in the system and their relative size to one another. For example, when more than one buffer cache is used, a plurality of buffer caches may be partially initialized. It is further appreciated that partial initialization of the buffer is not limited to the largest buffer. For example smaller buffers may be partially initialized as well (e.g., large pool and shared pool). However, partial initialization of the largest buffer or larger buffers in comparison to other buffers present in the system are preferred as discussed above for improving the startup time for a database system.

In the preferred embodiment of the present invention, larger buffers are partially initialized instead of being fully initialized because partial initialization requires less resources and faster in comparison to full initialization. Furthermore, larger buffers are more suitable for partial initialization because the difference in resource requirement for partial and full initialization of a large buffer is considerably more than the difference between the resource requirement for partial and full initialization of a smaller buffer. As such, the larger the difference between the resource requirement for partial and full initialization the more suited the buffer is for partial initialization. For the foregoing reasons, the buffer cache which is considerably larger than the large pool and the shared pool is partially initialized at 140.

According to one embodiment, memory initialization, whether total or partial typically involves meta data formatting and/or defining use data areas.

Upon partially initializing the buffer cache at step 140, the memory manager (MMAN) is instructed to initialize the remainder of the buffer cache in a background process at 150. It is appreciated that means other than the memory manager (MMAN) may be used to initialize the remainder of the buffer cache in the background process. The background process fully initializes the remainder of the buffer cache that has not been initialized and operates during the database system being open for use. It is appreciated that more resources may be assigned to initialize the buffers in the background as more resources become available in the system. As a result of initializing the remainder of the buffer cache in the background, other data that are more important and vital to opening the database system for use take priority and are initialized prior to background initialization. As such, essential components to opening the database for use are fully and partially initialized and the remainder of the buffer cache is initialized in the background, allowing the database to open for use prior to completion of full initialization. As such, the startup time for the database improves.

In some circumstances an application may demand more resources before the MMAN releases the buffer cache. It is appreciated that the MMAN performs a watchdog function wherein while the buffer cache is starting up and an application demands more resources than provided, the MMAN detects this demand and prevents the application from obtaining more resource until the buffer cache startup is completed and the buffer cache is released to the system.

Similar to partial initialization discussed above, it is appreciated that initializing the remainder of the buffer in the background process may be extended to other buffers as well. For example, in a system where four buffers are used (e.g., buffer cache 1, buffer cache 2, large pool and shared pool), buffer cache 1 and buffer cache 2 may be fully initialized in the background. It is also appreciated that initializing buffers in the background is not necessarily limited to larger buffers. However, in the preferred embodiment of the present invention the largest buffer gets initialized in the background process. As discussed above, the reason to initialize larger buffers in the background is because larger buffers take longer to fully initialize and initializing portions of larger buffers that are not necessary for opening the database in the background allows the database to open and become available for use while the remainder of the large buffer (e.g., buffer cache) gets initialized in the background.

Referring still to flow diagram 100 of FIG. 1, the optional recovery operations are performed if needed at 160. It is appreciated that even though recovery processes 160 are often performed in order to open the database for use, it is not always required. In one embodiment of the present invention, the recovery operation comprises of transaction recovery process and an instance recovery process. In the preferred embodiment of the present invention the recovery operations 160 are performed in parallel to background initialization process of the buffer cache. It is appreciated that the recovery operation 160 can be extended to run in parallel not only to the background initialization of the buffer cache but in parallel to background initialization of other memory components and buffers as well. It is further appreciated that even though it is advantageous to perform the recovery operation in parallel to the background initialization process, it is not required. As such, the recovery operation 160 may run partly in parallel to the background initialization.

In one embodiment of the present invention the database is opened for use at 170 (e.g., open phase commences) during the recovery operation of process 160. In the preferred embodiment of the present invention the database is opened while the recovery operation of process 160 is performed in parallel to background initialization of the remainder of the buffer cache. Opening the database for use during which the recovery operation is performed makes the database system available and accessible to the user for use, hence improving the startup time of the database. Opening the database for use in process 170 while the buffer cache gets initialized in the background process 150 running in parallel to the recovery operation of process 160 becomes significant when the size of the memory component is very large (e.g., 500 GB+). As such, performing the process described improves the startup time of a database system.

Figure 2:
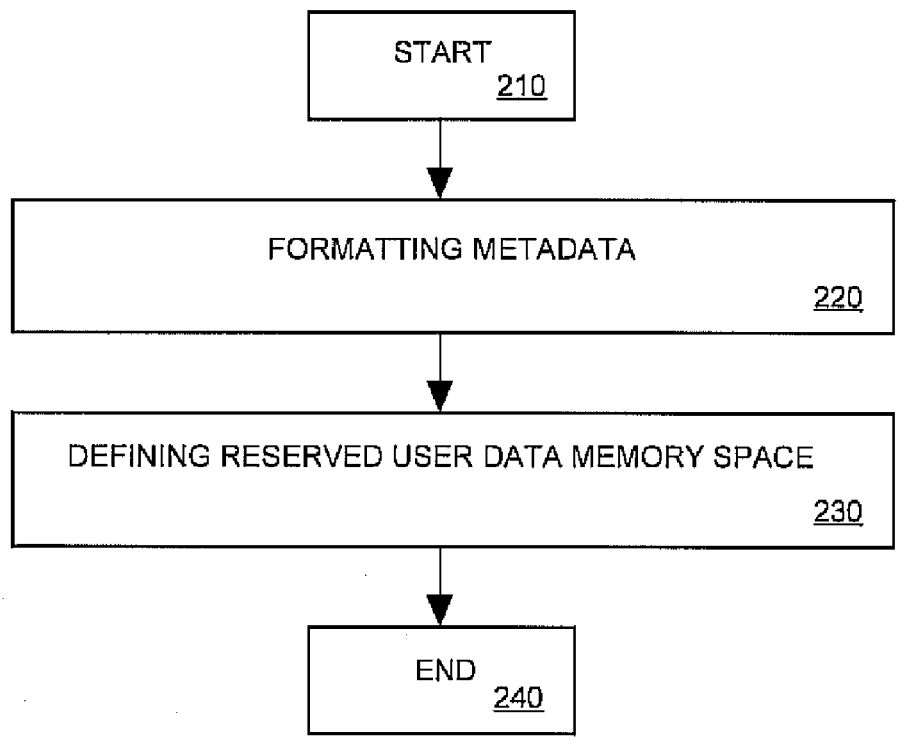
FIG. 2 shows a flow diagram of a computer implemented process for initializing a database system.

FIG. 2 shows a flow diagram for initializing the database in one embodiment of the present invention. The process for initializing the database starts at 210 and is followed by formatting metadata at 220. Defining reserved user data memory space at 230 follows formatting metadata at 220. Upon defining reserved user data memory space at 230, the initialization ends at 240.

It is appreciated that the order for formatting metadata at process 220 and defining reserved user data memory space at process 230 is for illustrative purposes only. As such, the order of formatting metadata at process 220 and defining reserved user data memory space at process 230 may be reversed. It is further appreciated that initialization may further comprise of additional steps not presented here or it may comprise of equivalent steps to the ones presented above as appreciated and understood by those skilled in the art.

Figure 3:
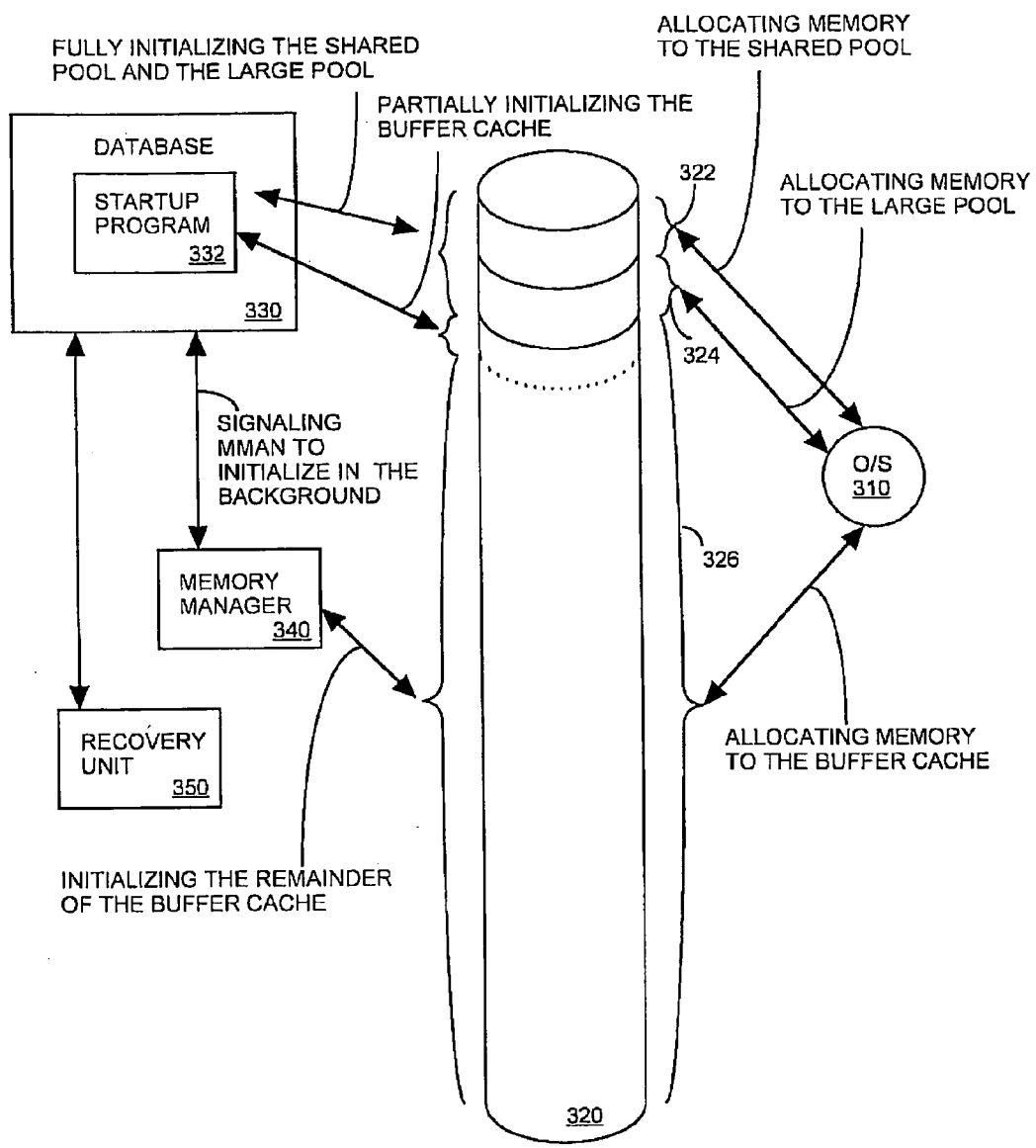
FIG. 3 shows one system embodiment of the present invention for improving the startup time of a database system.

FIG. 3 shows one system embodiment 300 of the present invention for improving the startup time of a database system 330. System 300 is comprised of an operating system 310 coupled to a memory unit 320. The memory unit 320 is further coupled to a database 330 that is coupled to a memory manager 340 and a recovery unit 350.

In one embodiment of the present invention, the operating system 310 allocates memory spaces for buffers within the system. It is appreciated that any memory allocator unit may be used to allocate memory spaces for buffers used by the database 330, however, in the preferred embodiment of the present invention the operating system 310 is used to allocate memory spaces.

It is also appreciated that the database 330 may use any number of buffers. For example, the database 330 may use five buffers. The buffers may include a shared pool, large pool, java pool, streams pool, and a buffer cache. Even though the database 330 may use any number of buffers in the system, for illustrative purposes three buffers are shown and described here. In the present example, the database 330 uses three buffers, first buffer, second buffer and a third buffer. The first buffer, second buffer and a third buffer used here are a shared pool, a large pool and a buffer cache respectively.

The operating system 310 allocates memory from a memory unit 320 to each buffer. As such, the operating system 310 allocates memory space 322 to the shared pool, allocates memory space 324 to the large pool and allocates memory space 326 to the buffer cache. It is appreciated that the allocated memory space of the buffer cache is considerably larger than the rest of the buffers because the buffer cache is considerably larger than the rest of the buffer (e.g., buffer cache may occupy 80% of the memory).

Referring still to FIG. 3, a startup program 332 of the database 330 fully initializes the shared pool and the large pool. As discussed above, initialization is comprised of formatting metadata and defining reserved user data memory space. However, as mentioned, initialization is not limited to formatting metadata and defining reserved user data memory space, but it may be extended to include other steps.

Upon fully initializing the shared pool and the large pool, the startup program 332 partially initializes the buffer cache. After completing partial initialization of the buffer cache, the database 330 signals the memory manager 340 to initialize the remainder of the buffer cache in the background process. The database 330 via a startup process also signals the recovery unit 350 to start recovering data if needed. In the preferred embodiment of the present invention, the recovery unit 350 is comprised of a transaction recovery unit and an instance recovery unit (not shown here). Furthermore, in the preferred embodiment of the present invention the database 330 is operational in open mode with said memory manager (MMAN) 340 concurrently initializing the remainder of the buffer cache in the background process. It is appreciated that the MMAN also performs a watchdog function, detecting and preventing an application from obtaining more resources than given prior to releasing the buffer cache back to the system as discussed above.

It is appreciated that the recovery unit 350 may or may not run in parallel to the memory manager (MMAN) 340, however, in the preferred embodiment of the present invention the recovery unit 350 runs in parallel to the memory manager (MMAN) 340. It is further appreciated that even though the memory manager (MMAN) 340 and the recovery unit 350 are shown as a separate unit to the database 330, they may be implemented as part of the database 330.

In one embodiment of the present invention the database system is opened for use after upon completion of the recovery operation. In the preferred embodiment of the present invention the database is mounted and the recovery operation is performed in parallel to initialization of the remainder of the buffer cache in the background. The database is opened for use after the recovery operation, if such recovery operation is required by the system. However, the database may be opened for use prior to completion of the remaining initialization of the buffer in the background. Opening the database for use during which the initialization operation is performed allows the database to be available and accessible to the user for use, hence improving the startup time of the database. Opening the database for use while the buffer cache gets initialized in the background in parallel to the recovery operation becomes significant when the size of the memory component is very large (e.g., 500 GB+). As such, performing the process described improves the startup time of a database system.

It is appreciated that the embodiments of the present invention can be extended to other systems such as operating system kernel bootstrapping. Operating system kernel bootstrapping performs a series of sequential activities which could be time consuming. Accordingly, employing the method and system described by the present invention can also improve the time for operating system kernel bootstrapping.

Figure 4:
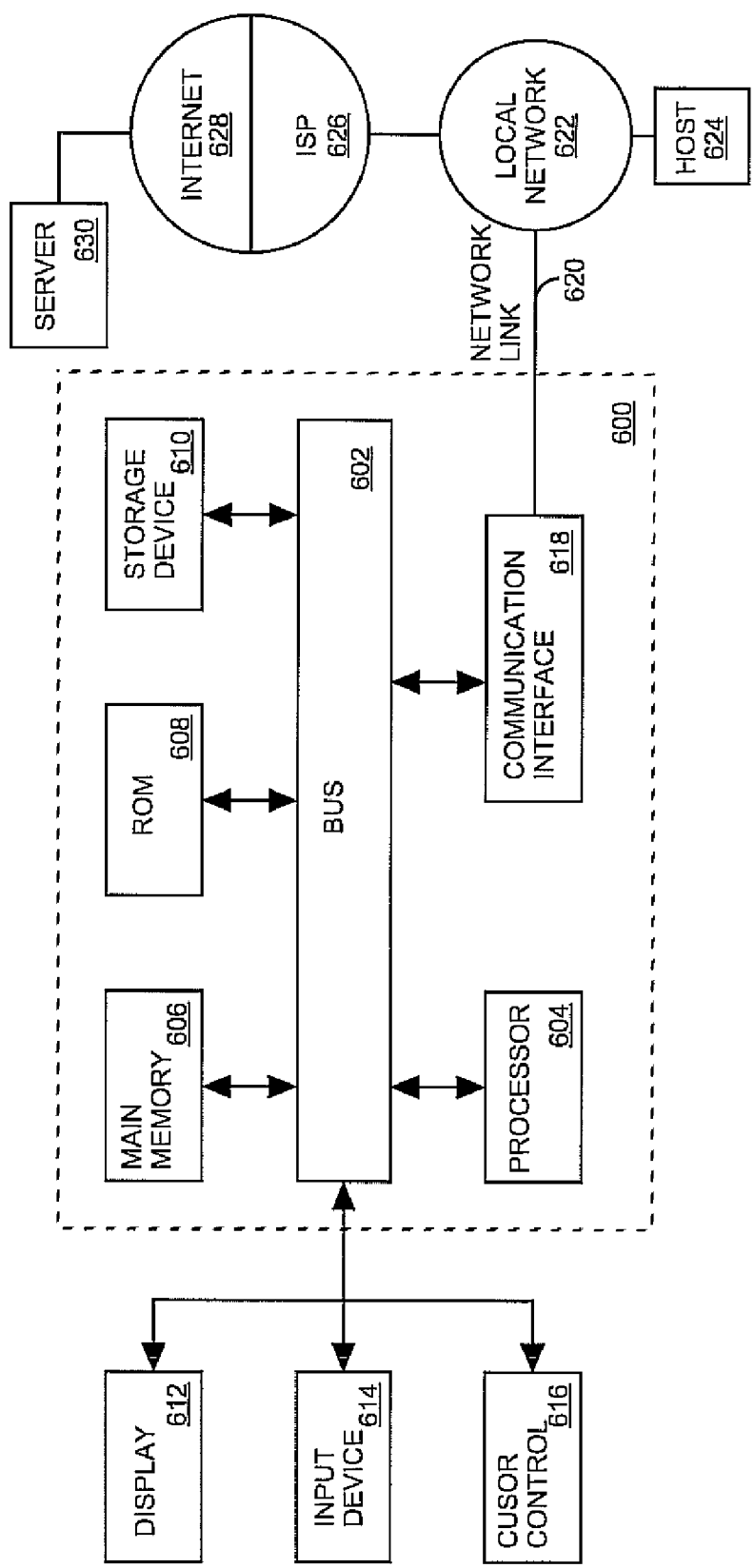
FIG. 4 illustrates a general purpose computer system that may serve as a platform for embodiments of the present invention.

FIG. 4 is a block diagram that illustrates a computer system 600 upon which an embodiment of the invention may be implemented. Computer system 600 may implement the method of starting up the database system as shown in FIGS. 1, 2 and 3 and includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A non-volatile storage device 610, such as a magnetic disk or optical disk, is provided and coupled to bus 602 for storing information and instructions and may store the persistent internal queue.

Computer system 600 may be coupled via bus 602 to an optional display 612, such as a cathode ray tube (CRT), for displaying information to a computer user. An optional input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

The invention is related to the use of computer system 600 for starting up a database system. According to one embodiment of the invention, the database is started up in response to processor 604 executing one or more sequences of one or more instructions contained in main memory 606 e.g., to implement processes 100 and 200. Such instructions may be read into main memory 606 from another computer readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send and receive messages through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of starting up a database system, said method comprising:
  allocating memory spaces for first, second and third buffers for use by said database system;
  initializing said first and second buffers;
  partially initializing said third buffer, wherein said third buffer is larger than said first and second buffers;
  instructing a memory manager to initialize a remainder of said third buffer in a background process;
  performing recovery operations in parallel; and
  opening said database system for use.

2. The method as described in claim 1 further comprising:
  operating said database system in an open phase; and
  initializing said remainder of said third buffer in said background process, wherein said background process and said recovery operations of said database system occur in parallel.

3. The method as described in claim 1 wherein said first buffer is a shared pool, said second buffer is a large pool and said third buffer is a buffer cache.

4. The method as described in claim 1 wherein an operating system performs said allocating memory.

5. The method as described in claim 1 wherein said recovery operations comprise transaction recovery and instance recovery.

6. The method as described in claim 1 wherein said partially initializing said third buffer initializes approximately 2 granules of memory per processor of said database system.

7. The method as described in claim 1 wherein said initializing comprises:

performing metadata formatting; and defining reserved user data memory space.

8. A system for starting up a database system, said system comprising:
- a memory allocator for allocating memory spaces for first, second and third buffers used by the database system;
- a startup program for fully initializing said first and second buffers and for partially initializing said third buffer, wherein said third buffer is larger than said first and second buffers;
- a memory manager in communication with said startup program, wherein upon completion of partial initialization said memory manager initializes a remainder of said third buffer in a background process wherein a portion of said background process operates during a period wherein said database system is open for use; and
- a recovery unit.

9. The system as described in claim 8 wherein said database system is open for use in an open mode with said memory manager concurrently initializing a remainder of said third buffer in said background process.

10. The system as described in claim 8 wherein said recovery unit operates in parallel to said memory manager.

11. The system as described in claim 8 wherein said memory allocator is an operating system.

12. The system as described in claim 8 wherein said startup applies to medium selected from a set comprising: non-volatile media, volatile media, and transmission media.

13. The system as described in claim 8 wherein said first buffer is a shared pool, said second buffer is a large pool and said third buffer is a buffer cache.

14. The system as described in claim 8 wherein said recovery unit further comprises:
- a transaction recovery unit; and
- an instance recovery unit.

15. A computer-useable medium having computer-readable program code stored thereon for causing a computer system to execute a method for starting up a database system, said method comprising:
- allocating memory spaces for first, second and third buffers for use by said database system;
- initializing said first and second buffers;
- partially initializing said third buffer, wherein said third buffer is larger than said first and second buffers;
- instructing a memory manager to initialize a remainder of said third buffer in a background process;
- performing recovery operations; and
- opening said database system for use.

16. The computer-useable medium as described in claim 15 further comprising:
- operating said database system in an open phase; and
- initializing said remainder of said third buffer in said background process, wherein said background process and said operating said database system occur in parallel.

17. The computer-useable medium as described in claim 15 wherein said first buffer is a shared pool, said second buffer is a large pool and said third buffer is a buffer cache.

18. The computer-useable medium as described in claim 15 wherein an operating system performs said allocating memory.

19. The computer-useable medium as described in claim 15 wherein said recovery operations comprise transaction recovery and instance recovery.

20. The computer-useable medium as described in claim 15 wherein said partially initializing said third buffer initializes approximately 2 granules of memory per processor of said database system.

21. The computer-useable medium as described in claim 15 wherein said initializing comprises:
- performing metadata formatting; and
- defining reserved user data memory space.

* * * * *

UNITED STATES PATENT AND TRADEMARK OFFICE
CERTIFICATE OF CORRECTION

PATENT NO. : 7,467,279 B2  Page 1 of 1
APPLICATION NO. : 11/395613
DATED : December 16, 2008
INVENTOR(S) : Lahiri et al.

It is certified that error appears in the above-identified patent and that said Letters Patent is hereby corrected as shown below:

On the Title page, in field (75), in column 1, in "Inventors", line 3, delete "Foster City," and insert -- Palo Alto, --, therefor.

On sheet 4 of 4, in Figure 4, Ref. Numeral 616, line 1, delete "CUSOR" and insert -- CURSOR --, therefor.

Signed and Sealed this

Fourth Day of May, 2010

David J. Kappos
*Director of the United States Patent and Trademark Office*